(12) United States Patent
Mukker et al.

(10) Patent No.: US 10,649,484 B2
(45) Date of Patent: May 12, 2020

(54) DYNAMIC ADAPTIVE CLOCKING FOR NON-COMMON-CLOCK INTERFACES

(71) Applicant: INTEL CORPORATION, Santa Clara, CA (US)

(72) Inventors: Anoop Mukker, Folsom, CA (US); Eng Hun Ooi, Georgetown (MY); Robert J. Royer, Jr., Portland, OR (US); Brian R. McFarlane, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 80 days.

(21) Appl. No.: 15/960,074

(22) Filed: Apr. 23, 2018

(65) Prior Publication Data

US 2018/0307263 A1 Oct. 25, 2018

Related U.S. Application Data

(63) Continuation of application No. 14/866,237, filed on Sep. 25, 2015, now Pat. No. 9,952,619.

(51) Int. Cl.
| | |
|---|---|
| *G06F 1/08* | (2006.01) |
| *G06F 1/12* | (2006.01) |
| *G06F 13/40* | (2006.01) |
| *G06F 13/42* | (2006.01) |
| *H04J 3/06* | (2006.01) |

(52) U.S. Cl.
CPC .................. *G06F 1/08* (2013.01); *G06F 1/12* (2013.01); *G06F 13/40* (2013.01); *G06F 13/4291* (2013.01); *H04J 3/0697* (2013.01)

(58) Field of Classification Search
CPC ... G06F 1/08; G06F 1/12; G06F 13/40; G06F 13/4291
See application file for complete search history.

(56) References Cited

U.S. PATENT DOCUMENTS

| | | | |
|---|---|---|---|
| 8,417,983 B2* | 4/2013 | Machnicki | G06F 1/08 326/93 |
| 8,626,102 B1* | 1/2014 | Bidichandani | H04B 1/3805 455/164.2 |
| 2016/0364359 A1* | 12/2016 | Wietfeldt | G06F 13/4265 |
| 2016/0364363 A1* | 12/2016 | Wietfeldt | G06F 13/4291 |

OTHER PUBLICATIONS

Static Data Structures vs. Dynamic Data Structures, Dec. 2, 2010, 5 pages.*

* cited by examiner

*Primary Examiner* — Stefan Stoynov

(57) ABSTRACT

The present disclosure provides devices and techniques to dynamically change the operating frequency of an interface where components on the interface have non-common clocks. An interface component may be provided with a frequency negotiation component to negotiate a shift in an operating frequency with other component on an interface where the different components have non-common clocks.

19 Claims, 9 Drawing Sheets

700

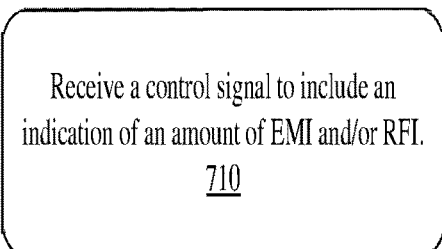

Receive a control signal to include an indication of an amount of EMI and/or RFI.
710

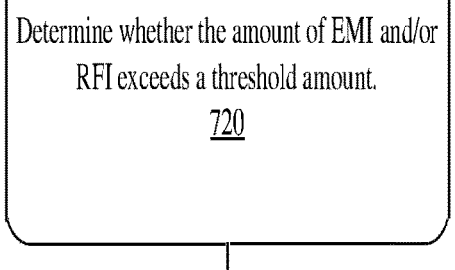

Determine whether the amount of EMI and/or RFI exceeds a threshold amount.
720

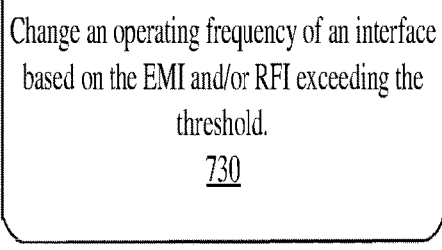

Change an operating frequency of an interface based on the EMI and/or RFI exceeding the threshold.
730

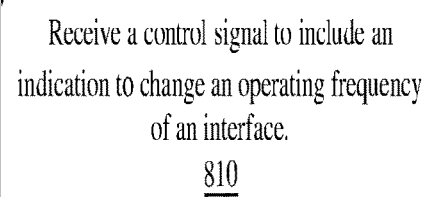

Receive a control signal to include an indication to change an operating frequency of an interface.
810

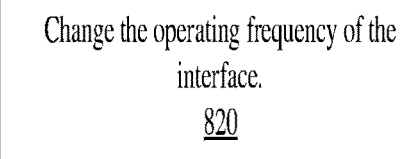

Change the operating frequency of the interface.
820

FIG. 8

DYNAMIC ADAPTIVE CLOCKING FOR NON-COMMON-CLOCK INTERFACES

CROSS-REFERENCE TO RELATED APPLICATIONS

This application is a continuation of, claims the benefit of and priority to, previously filed U.S. patent application Ser. No. 14/866,237 filed on Sep. 25, 2015, now U.S. Pat. No. 9,952,619, the subject matter of which is hereby incorporated by reference in its entirety.

TECHNICAL FIELD

Examples described herein are generally related to interfaces and more specifically to dynamically adjusting operating frequency of interfaces operating with independent reference clocks.

BACKGROUND

Some modern electrical circuits emit electromagnetic radiation during normal operation. For example, interfaces that communicatively couple different components of a system may emit electromagnetic radiation as a result of processing signals during operation. Such radiation may cause noise and interference with the operation of other components in the system.

Various techniques are employed to reduce or limit the interference resulting from emission of electromagnetic radiation. For example, bypass capacitors may be added to various components of the system to decouple the components from each other. Shielding may be added to the system to shield various components from each other, thereby preventing emission of electromagnetic radiation from one component affecting another component.

BRIEF DESCRIPTION OF THE DRAWINGS

FIG. 7 illustrates a first example logic flow.
FIG. 8 illustrates a second example logic flow.

DETAILED DESCRIPTION

As contemplated in the present disclosure, multiple components of a system operating based on independent reference clocks may dynamically adjust their operating frequency during runtime to reduce interference caused by electromagnetic interference (EMI) and/or radio frequency interference (RFI). In general, the present disclosure provides that multiple components of a system communicatively coupled via an interface may negotiate an operating frequency of the interface. For example, the components may negotiate a change in the operating frequency of the interface upon detection of excessive EMI and/or RFI. In particular, the component may negotiate a change in the operating frequency of the interface to dynamically adjust the operating frequency of the interface to a frequency outside the range of frequencies causing the EMI and/or RFI to reduce interference.

Figure 1:
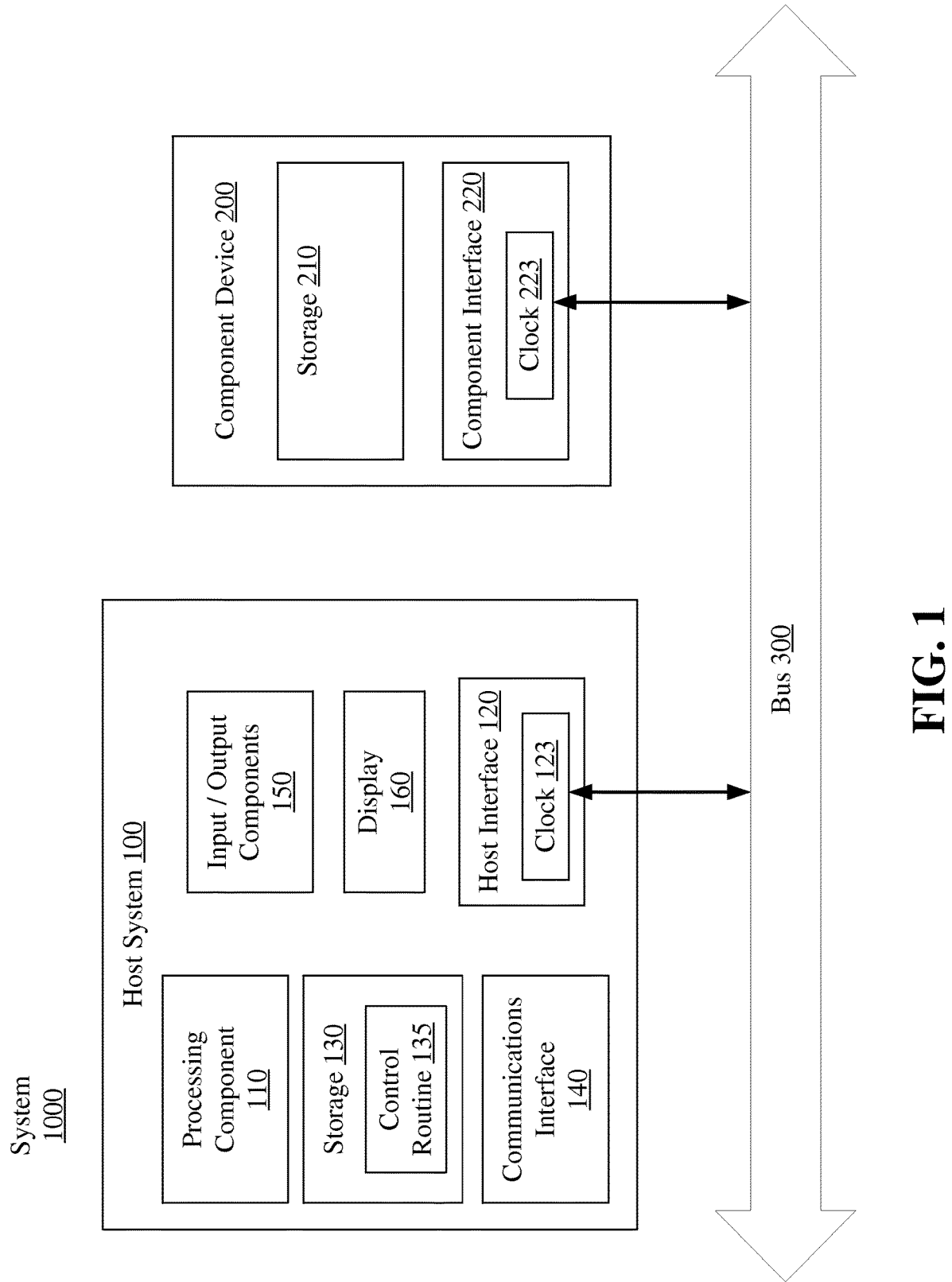
FIG. 1 illustrates an example first system.
Figure 2:
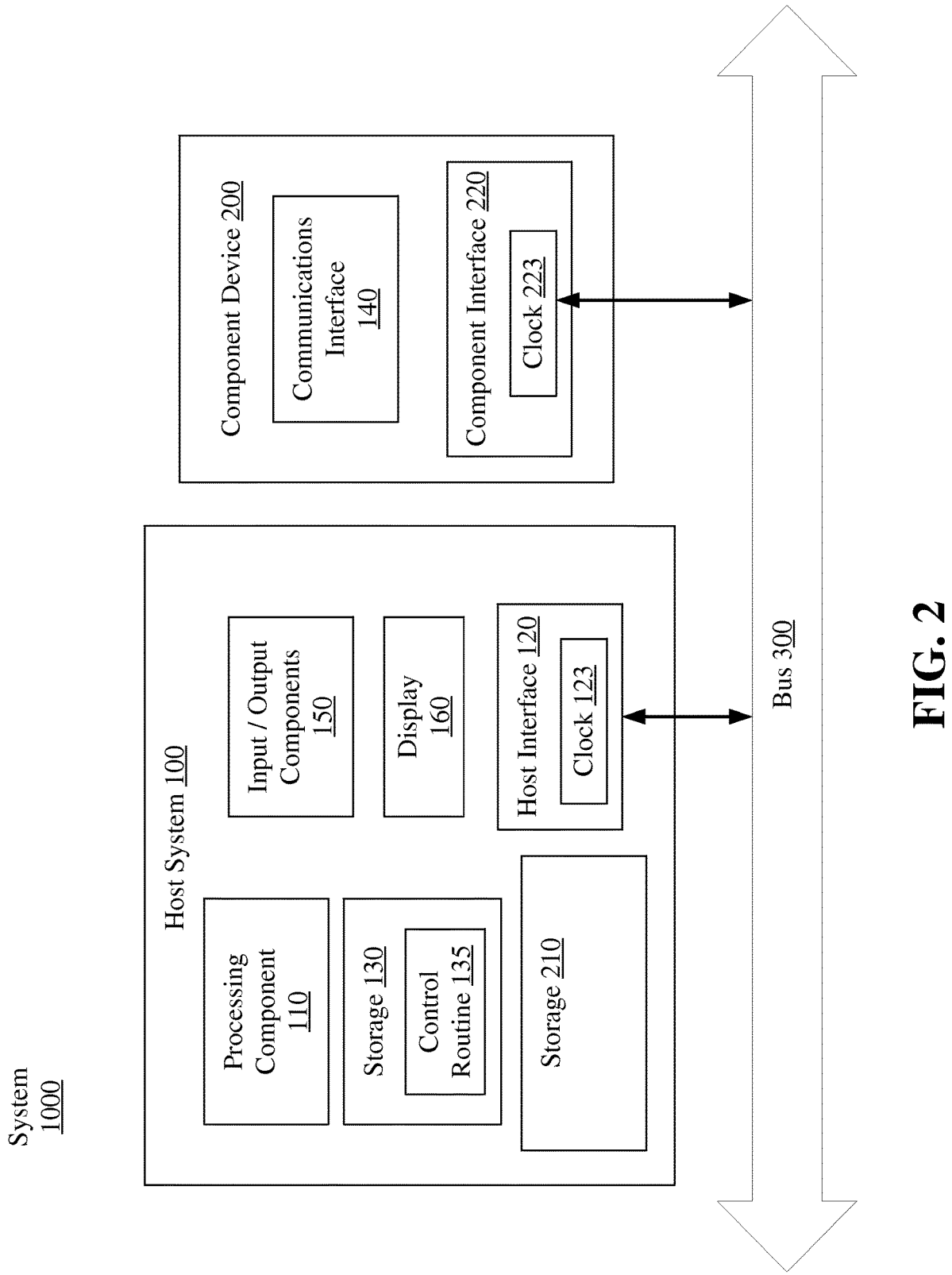
FIG. 2 illustrates an example second system.
Figure 3:
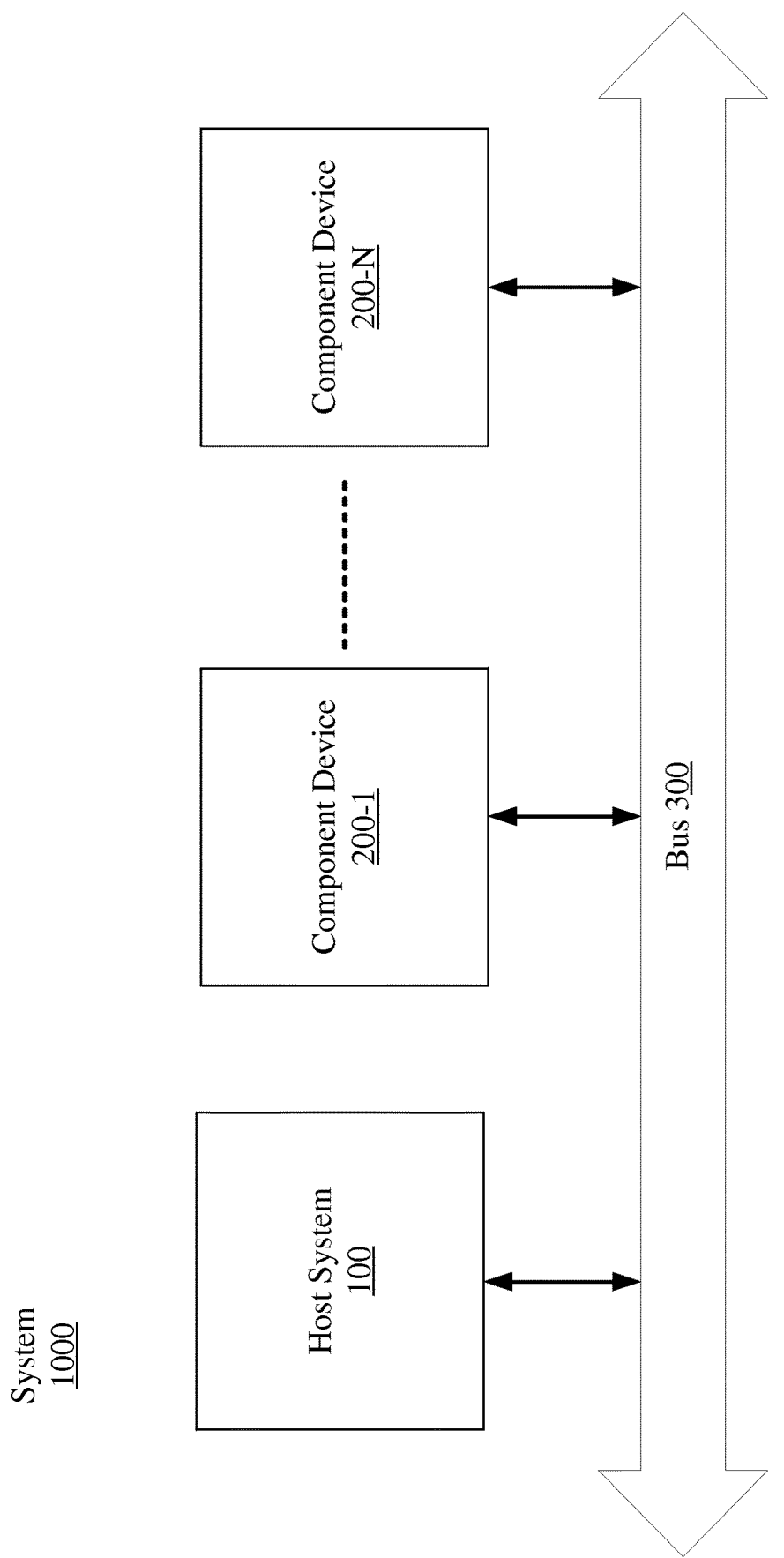
FIG. 3 illustrates an example third system.

FIGS. 1-3 illustrate an example first system 1000. As shown in this figure, the example first system 1000 includes a host system 100 and a component device 200. The system 1000 is depicted as a simplified block diagram, which may, in some examples, correspond to a computing device including the host system 100 and a component device 200. As depicted, the host system 100 and the component device 200 are operably coupled. With some examples, the host system 100 and the component device 200 may be implemented in separate housings. With some examples, the host system 100 and the component device 200 may be implemented in the same housing. With some examples, the host system 100 or the component device 200 may be implemented as a System-on-Chip (SoC) or the like. For example, the host system 100 may be an SoC and the component device 200 may operably couple to the SoC. Examples are not limited in this context.

In general, FIG. 1 illustrates the system 1000 where the component device 200 may be a storage device, such as, for example, a solid state drive (SSD), a memory component, or the like while FIG. 2 illustrates the system 1000 where the component device 200 may be a network interface component, such as, for example, a radio, or the like. FIG. 3 illustrates an example where the host system is operably coupled to multiple component devices 200. It is to be appreciated that these examples are given for illustration only and that the present disclosure may be implemented with any number of interfaces (e.g., refer to FIG. 3) that operate based on each component coupled to the interface have an independent reference clock. In particular, the present disclosure may be implemented for any number of interfaces to provide for the dynamic negotiation of operating frequency between the interfaces, for example, to reduce EMI and/or RFI effects on the interfaces, a system in which the interfaces are implemented, adjacent interfaces, and/or the like.

The host system 100 and the component device 200 may be operably coupled via a communication bus 300. In general, the communication bus 300 may be any data communication bus, such as, for example, peripheral component interconnect express (PCIe), non-volatile memory express (NVMe), universal serial bus (USB), system management bus (SMBus), SAS (e.g., serial attached small computer system interface (SCSI)) interfaces, serial AT attachment (SATA) interfaces, or the like. In particular, the host system 100 and the component device 200 may each include an interface, for example, the host interface 120 and 220) to operably connect to the bus 300. In particular, the interfaces 120 and 220 may enable the host system 100 and the component device 200 to send and receive information elements over the bus 300. Additionally, a third interface may be provided, for example, the communications interface 140.

In general, the host interface 120, the component interface 220, and the communications interface 140 may include logic and/or features to support a communication interface. For these examples, host interface 120, component interface 220, and communications interface 140 may include one or more interfaces that operate according to various communication protocols or standards to communicate over direct or network communication links. Direct communications may occur via use of communication protocols or standards described in one or more industry standards (including progenies and variants) such as those associated with the SMBus specification or the PCI Express specification. Network communications may occur via use of communication protocols or standards such those described in one or more Ethernet standards promulgated by the Institute of Electrical and Electronics Engineers (IEEE). For example, one such Ethernet standard may include Carrier sense Multiple access with Collision Detection (CSMA/CD) Access Method and Physical Layer Specifications, published in December 2012 (hereinafter "IEEE 802.3-2012).

The interfaces 120 and 220 each include a clock, for example, the host interface 120 includes the independent reference clock 123 while the component interface 220 includes the independent reference clock 223. The present disclosure provides that during operation, the interfaces 120 and 220 may negotiate an operating frequency. Said differently, the interfaces 120 and 220 may dynamically change the frequency for communication over the bus 300. In particular, the interfaces 120 and 220 may change the frequency during operation to reduce the EMI and/or RFI the interfaces have on another component of the system, for example, the communications interface 140.

Referring more specifically to FIG. 1, the host system may be made up, at least in part, of a processing component 110, the host interface 120 and the clock 123, storage 130, communications interface 140, input and/or output components 150, or a display 160. The storage 130 may include control routine 135, which may include programming, logic, and/or features to cause the host system to perform various functions. For example, the control routine 135 may include an operating system or other programming to enable the host system to perform various functions.

With some examples, the processor component 110 may include circuitry or processor logic, such as, for example, any of a variety of commercial processors. In some examples, the processor component 110 may include multiple processors, a multi-threaded processor, a multi-core processor (whether the multiple cores coexist on the same or separate dies), and/or a multi-processor architecture of some other variety by which multiple physically separate processors are in some way linked. Additionally, in some examples, the processor component 110 may include graphics processing portions and may include dedicated memory, multiple-threaded processing and/or some other parallel processing capability.

The storage 130 may include logic, a portion of which includes arrays of integrated circuits, forming non-volatile memory to persistently store data or a combination of non-volatile memory and volatile memory. It is to be appreciated, that the component device 200, and particularly, the storage 210 may be based on any of a variety of technologies. In particular, the arrays of integrated circuits included in storage 210 may be arranged to form one or more types of memory, such as, for example, dynamic random access memory (DRAM), NAND memory, NOR memory, 3-Dimensional cross-point memory, ferroelectric memory, silicon-oxide-nitride-oxide-silicon (SONOS) memory, polymer memory such as ferroelectric polymer memory, ferroelectric transistor random access memory (FeTRAM or FeRAM), nanowire, phase change memory, magnetoresistive random access memory (MRAM), spin transfer torque MRAM (STT-MRAM) memory, or the like.

In various examples, the input and/or output components 150 may include one or more components to provide input to or to provide output from the system 100. For example, the input and/or output components 150 may be a keyboard, mouse, joystick, microphone, track pad, speaker, haptic feedback device, or the like. In various embodiments, the display 160 may be based on any of a variety of displays (e.g., Plasma, LCD, LED, OLED, or the like) for displaying images and may include touch functionality.

The host interface 120 may be any of a variety of interfaces to operably connect the host system 100 to the component device 200. In particular, the host interface 120 may be configured to operably connect to component interface 220 within the component device 200 via the bus 300. The clock 123 may be any device to which the frequency of operation of the host interface 120 is based. For example, the clock 123 may be an oscillating circuit (e.g., crystal oscillating, or the like) that can be used to determine a frequency of operation.

The component device 200 may be made up, at least in part, of storage 210, component interface 220 and clock 223. In general, the storage 210 may include logic, a portion of which includes arrays of integrated circuits, forming non-volatile memory to persistently store data or a combination of non-volatile memory and volatile memory. It is to be appreciated, that the component device 200, and particularly, the storage 210 may be based on any of a variety of technologies. In particular, the arrays of integrated circuits included in storage 210 may be arranged to form one or more types of memory, such as, for example, DRAM, NAND memory, NOR memory, 3-Dimensional cross-point memory, ferroelectric memory, silicon-oxide-nitride-oxide-silicon (SONOS) memory, polymer memory such as ferroelectric polymer memory, ferroelectric transistor random access memory (FeTRAM or FeRAM), nanowire, phase change memory, magnetoresistive random access memory (MRAM), spin transfer torque (STT) memory, or the like.

The component interface 220 may be any of a variety of interfaces to operably connect the component device 200 to the host system 100. In particular, the component interface 220 may be configured to operably connect to host interface 120 within the host system 100 via the bus 300. The clock 123 may be any device to which the frequency of operation of the host interface 120 is based. For example, the clock 123 may be an oscillating circuit (e.g., crystal oscillating, or the like) that can be used to determine a frequency of operation.

Turning more particularly to FIG. 2, an example of the system 1000 is given where the host system includes the storage 210 and the component device 200 includes the communications interface 140. For example, the system 1000 depicted in FIG. 2 may include the host system 100 and the component system 200 where the component system 200 is a communications device, such as, a network interface card, a radio, or the like. It is further noted, that the same reference numerals are used in FIG. 2 as were used in FIG. 1 for purposes of convenience and clarity. However, as depicted and described, the components may be arranged differently than that depicted in FIG. 1. In particular, the host system 100 may be made up, at least in part, of the processing component 110, the host interface 120 and the clock 123, the input and/or output components 150, the storage 210, or the display 160. Additionally, the component device 200 may be made up of the communications interface 140, the component interface 220 and the clock 223.

Turning more specifically to FIG. 3, the system 1000 is depicted including the host system 100 and a number of component devices 200-n, where n is any positive integer. In particular, the system 1000 is depicted including component devices 200-1 to 200-N. It is to be appreciated, that the component devices 200-1 to 200-N may be different types of devices, each of which includes an interface (e.g., the component interface 220) to communicatively couple the component device 200-n to the bus 300. For example, the interface 200-1 may be a memory device while the interface 200-N is a communications device, a display device, an input device, an output device, or the like.

Each of the host interface 120 and the component interface 220 may include logic and/or features to dynamically negotiate a frequency of operation of the interface to reduce an EMI or RFI effecting other components, such as, the communications interface 140, of the system. The host interface 120 and component interface 220 are described in greater detail below (e.g., refer to FIGS. 3-4). However, in general, the host interface 120 and the component interface 220 may operate to transition from one steady state operating frequency to another, different, steady state operating frequency. It is important to note, that the host interface 120 and the component interface 220 may negotiate to dynamically change their operating frequency even though both the host interface 120 and the component interface 220 have independent clocks (e.g., clock 123 and clock 223).

System 1000 may be part of a host computing platform that may be, for example, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of system 1000 described herein, may be included or omitted in various embodiments of system 1000, as suitably desired.

The components and features of system 1000 may be implemented using any combination of discrete circuitry, application specific integrated circuits (ASICs), logic gates and/or single chip architectures. Further, the features of system 100 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the example host system 100, the component device 200, and the system 1000 shown in the block diagram of FIG. 1 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in examples.

Figure 4:
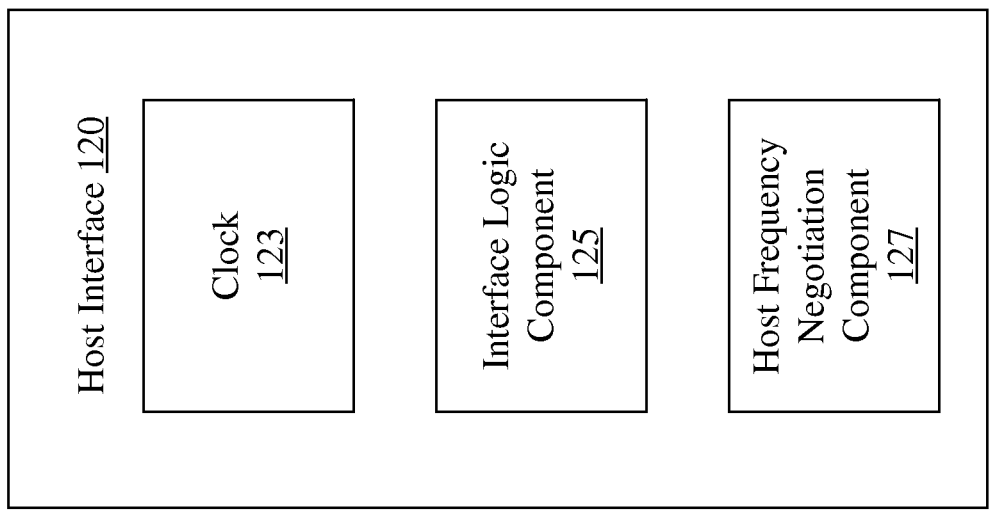
FIG. 4 illustrates a portion of a first component of the example first, second, or third system.
Figure 5:
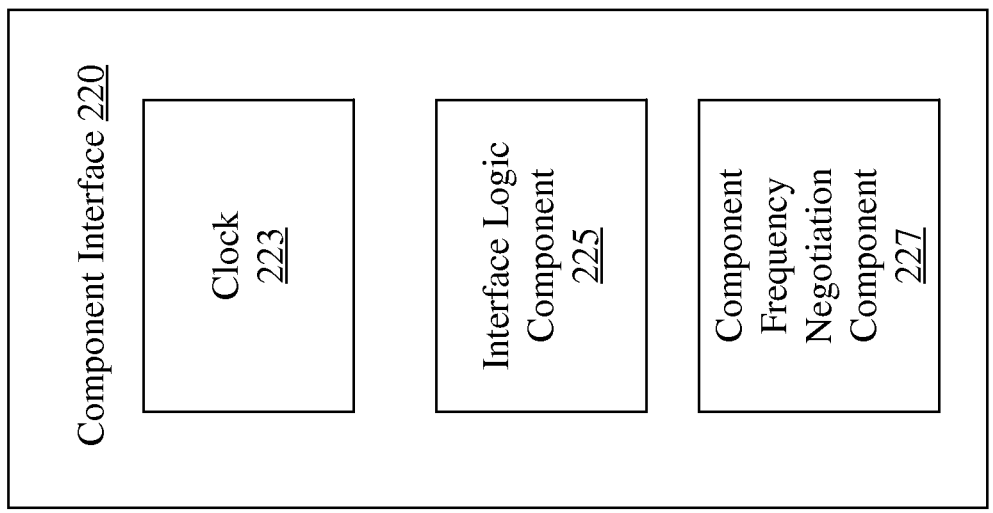
FIG. 5 illustrates a portion of a second component of the example first, second, or third system.

FIGS. 4-5 illustrate examples of a portion of the system 1000 depicted in FIGS. 1-3. In particular, FIG. 4 depicts a block diagram of the host interface 120 in greater detail while FIG. 5 depicts a block diagram of the component interface 220 in greater detail.

Turning more specifically to FIG. 4, the host interface 120 may comprise the clock 123, an interface logic component 125 and a host frequency negotiation component (HFNC) 127. In general, the interface logic component 125 may include circuitry and/or features to facilitate communication over the bus 300. For example, where the bus 300 is a NVMe bus, the interface logic component 125 may include circuitry and/or features to communicate via an NVMe bus and particularly in compliance with any NVMe standards. For example, the interface logic component 125 may include circuitry to implement communications protocols in compliance with the NVM Express Specification version 1.2, published November 2013. In general, the HFNC 127 may include circuitry and/or features to negotiate an operating frequency with another interface (e.g., the component interface 220, or the like) and to enable the interface logic component 125 to operate based on the negotiated frequency. This is explained in greater detail below, for example, with respect to FIG. 6. For example, the interface logic component 125 may implement dynamic frequency scaling to change the operating frequency of the host interface 120 to the negotiated frequency. In particular, the HFNC 127 may receive a control signal to include an indication that EMI and/or RFI effects are detected. For example, the HFNC 127 may receive a control signal (e.g., from the control routine 135, or the like) to include an indication that the communications interface 140 is experiencing EMI and/or RFI effects. With some examples, the control routine 135 may determine whether the EMI and/or RIF effects exceed a threshold amount of EMI and/or RFI effect. For example, the control routine 135 may determine whether a parameter of the communications interface 140 (e.g., packet loss, throughput, signal to noise ratio (SNR), signal strength, or the like) is below a threshold amount and send a control signal to the HFNC 127, the control signal to include an indication that excessive EMI and/or RFI effects are detected.

Based on receiving an indication that excessive EMI and/or RFI effects are detected, the HFNC 127 may send a control signal to the component interface 220 to negotiate a new operating frequency. This is explained in greater detail below with reference to FIG. 6. However, in general, the HFNC 127 may send a control signal to the component interface(s) (e.g., the component interface 220-1, 220-N, or the like) to include an indication that the operating frequency for the bus 300 is to be changed. In some examples, the HFNC 127 may specify a new operating frequency. For example, the HFNC 127 may dictate that the operating frequency be changed from a first operating frequency (e.g., the current operating frequency causing the EMI and/or RFI effects) to a second operating frequency (outside a range of EMI and/or RFI frequencies, or the like).

The HFNC 127 may receive control signals from the component interface(s) to include an indication that the component interface(s) are ready to change the operating frequency. For example, the HFNC 127 may receive an indication from the component interface 220 indicating that the component interface 220 is ready to shift the operating frequency as dictated by the HFNC 127. This is explained in greater detail below, for example, with respect to FIG. 6. The HFNC 127 may determine whether all component interfaces (e.g., the interface 220-1, 220-N, or the like) are ready to change operating frequencies. For example, the HFNC 127 may determine whether a control signal indicating the component interface is ready has been received from all component interfaces active on the bus 300. The HFNC 127 may send a control signal to the component interfaces indicating they may shift frequencies based on a determination that all component interfaces are ready to shift operating frequencies.

The HFNC 127 may determine whether all component interface(s) have shifted frequencies. For example, the HFNC 127 may determine whether the component interface 220-1 and 220-N have shifted frequencies to the newly dictated operating frequency. In some examples, the HFNC 127 may receive a control signal indicating that the component interface(s) have completed shifting their operating frequency. Additionally, the HFNC 127 may send a control signal to the component interfaces to indicate that all active component interfaces have shifted their operating frequency.

Turning more specifically to FIG. 5, the component interface may comprise the clock 223, an interface logic component 225 and a component frequency negotiation component (CFNC) 227. In general, the interface logic component 225 may include circuitry and/or features to facilitate communication over the bus 300. For example, where the bus 300 is an NVMe bus, the interface logic 225 may include circuitry and/or features to communicate via an NVMe bus and particularly in compliance with any NVMe standards. In general, the CFNC 227 may include circuitry and/or features to negotiate an operating frequency with another interface (e.g., the host interface 120, another component interface, or the like) and to enable the interface logic component 225 to operate based on the negotiated frequency.

In particular, the CFNC 227 may receive a control signal to include an indication to shift operating frequencies from a first operating frequency to a second operating frequency. For example, the CFNC 227 may receive an information element, an interrupt, or the like from the HFNC 127 to include an indication that the interface 220 should shift operating frequencies. As discussed above, the operating frequency shift may be initiated based on a detection of EMI and/or RIF effects that exceed a threshold amount of EMI and/or RFI effect.

The CFNC 227, upon receiving an indication to shift operating frequencies, may activate a transient frequency compensation for the interface 220. In particular, the CFNC 227 may activate transient frequency compensation to account for mismatches between operating frequencies of the devices on the bus 300. For example, during the shifting of the operating frequency, communication over the bus 300 may continue, as such, the transient frequency compensation may compensate or adjust for these temporary mismatches in operating frequency. The CFNC 227 may send a control signal to the HFNC 127 to indicate that the component interface is ready to shift operating frequencies.

The CFNC 227 may receive a control signal to include an indication that the component interface 220 may shift operating frequencies. In particular, the CFNC 227 may receive a control signal form the HFNC 127 to include an indication that the CFNC 227 may shift operating frequencies. As detailed above, the HFNC 127 may send the control signal indicating the operating frequency may be shifted based on a determination that all active components on the bus 300 are ready to shift frequencies (e.g., the component device 200-1, the component device 200-N, or the like).

The CFNC 227 may determine whether the first frequency has been changed to the second frequency and may deactivate the transient frequency compensation and activate a steady-state frequency compensation. For example, the CFNC 227 may receive a control signal from the HFNC 127 to include an indication that all active devices on the bus 300 have shifted their operating frequency to the newly dictated operating frequency. The CFNC 227 can, based on the received control signal, deactivate transient frequency compensation and activate steady-state frequency compensation.

Accordingly, the present disclosure provides that interfaces operating with non-common clocks (e.g., the interface 120, the interface 220-1, the interface 220-N, or the like) may negotiate a change in operating frequency to reduce the effects of EMI and/or RFI.

Included herein is one or more techniques and/or logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A technique or a logic flow may be implemented in software, firmware, and/or hardware. In software and firmware embodiments, a technique or a logic flow may be implemented by computer executable instructions stored on at least one non-transitory computer readable medium or machine readable medium, such as an optical, magnetic or semiconductor storage. The embodiments are not limited in this context.

Figure 6:
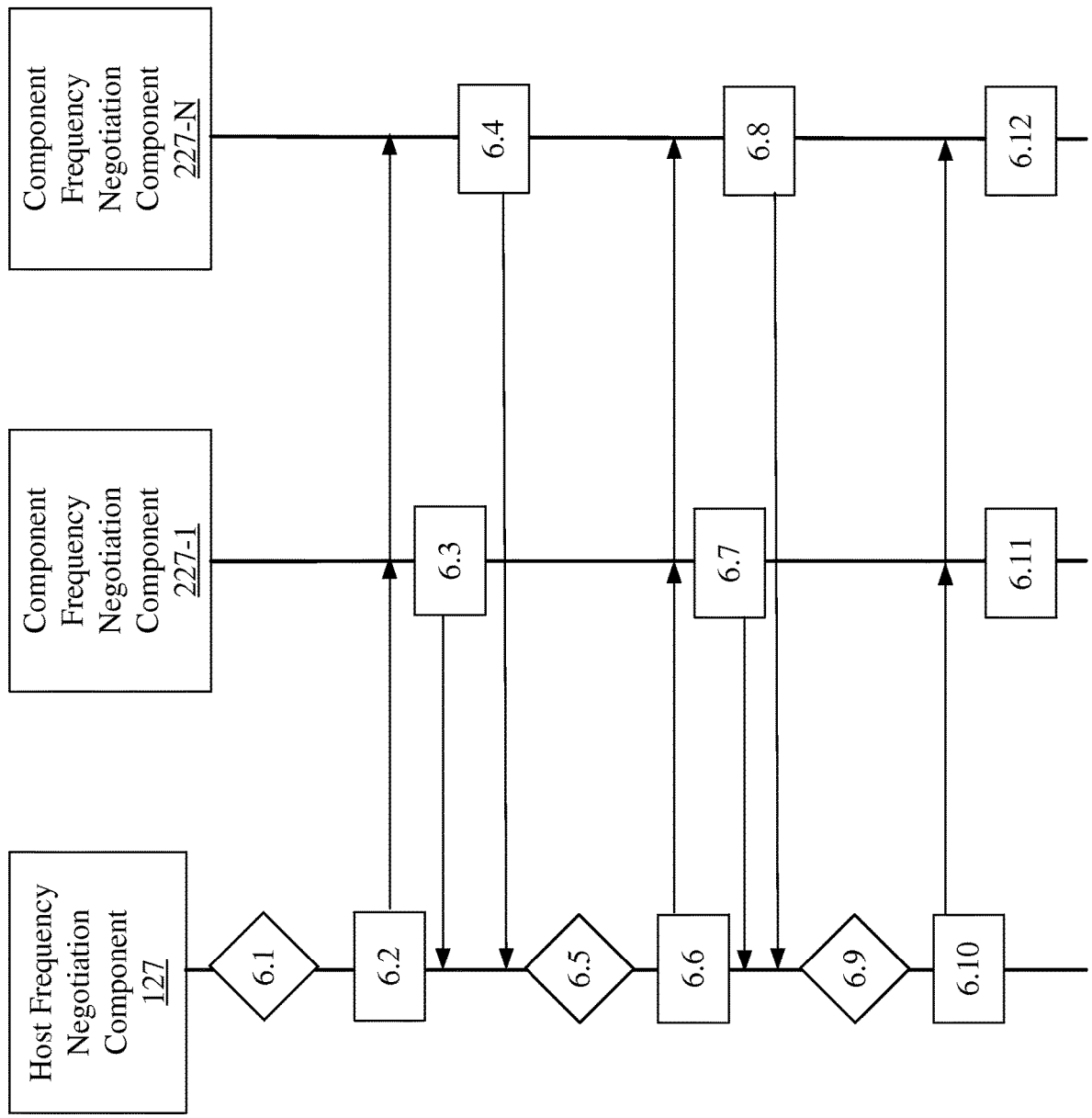
FIG. 6 illustrates an example technique.

FIG. 6 illustrates an example technique 600 for dynamically coordinating an operating frequency between multiple interfaces. In particular, the technique 600 depicts an example logic flow to provide multiple interfaces, each operating based on an independent reference clock, to dynamically coordinate an operating frequency. The technique 600 may begin at block 6.1, at block 6.1, the HFNC 127 may determine whether excessive EMI and/or RFI is detected. For example, the HFNC 127 may receive a control signal indicating excessive EMI and/or RFI effects are experienced by another component of the system (e.g., the communications interface 140, or the like).

Continuing to block 6.2, the HFNC 127, based on determining that excessive EMI and/or RFI is detected, may determine a new operating frequency and may send a control signal to the component interfaces active on the bus 300 to include an indication to shift to the new operating frequencies. For example, the HFNC 127 may send a control signal to the CFNC 227-1 and the CFNC 227-N to include an indication to shift operating frequencies.

Continuing to blocks 6.3 and 6.4, the component interfaces active on the bus 300 may prepare to shift frequencies. In particular, the component interfaces may activate transient frequency compensation. For example, at block 6.3, the CFNC 227-1 may activate transient frequency compensation and may send a control signal to the HFNC 127 to indicate that the CFNC 227-1 is ready to shift operating frequencies. Likewise, at block 6.4, the CFNC 227-N may activate transient frequency compensation and may send a control signal to the HFNC 127 to indicate that the CFNC 227-N is ready to shift operating frequencies.

Continuing to block 6.5, the HFNC 127 may determine whether all interfaces are ready to shift frequencies. For example, the HFNC 127 may determine whether control signals indicating the CFNCs 227 are ready to shift operating frequencies have been received.

Continuing to block 6.6, the HFNC 127, based on determining that all interfaces are ready to shift operating frequencies, may send a control signal to each of the interfaces indicating that they may shift operating frequencies. With some examples, the HFNC 127 may write a value to a register in each of the interfaces, the register and value to indicate that each of the interfaces are ready to shift operating frequencies. With some examples, the HFNC 127 may send a command (e.g., a PCIe configuration write command, an MIPI configuration set command, or the like) to indicate that each of the interfaces are ready to shift operating frequencies. With some examples, the HFNC 127 may send a proprietary command (e.g., a vendor defined message (VDM), or the like) to indicate that each of the interfaces are ready to shift operating frequencies.

Continuing to blocks 6.7 and 6.8, the component interfaces active on the bus 300 may shift operating frequencies. For example, at block 6.7, the CFNC 227-1 may shift operating frequencies to the operating frequency dictated by the HFNC 127 and may send a control signal to the HFNC 127 to indicate that the CFNC 227-1 has shifted operating frequencies. Likewise, at block 6.8, the CFNC 227-N may shift operating frequencies to the operating frequency dictated by the HFNC 127 and may send a control signal to the HFNC 127 to indicate that the CFNC 227-N has shifted operating frequencies.

Continuing to block 6.9, the HFNC 127 may determine whether all interfaces has shifted operating frequencies. For example, the HFNC 127 may determine whether control signals indicating the CFNCs 227 have shifted operating frequencies have been received.

Continuing to block 6.10, the HFNC 127 may send a control signal to each of the interfaces indicating that the operating frequency shift is complete.

Continuing to blocks 6.11 and 6.12, the component interfaces active on the bus 300 may resume a steady-state operation. For example, at block 6.11, the CFNC 227-1 may deactivate transient frequency compensation and may activate a steady-state frequency compensation. Likewise, at block 6.12, the CFNC 227-N may deactivate transient frequency compensation and may activate a steady-state frequency compensation.

In general, the technique 600 may be implemented for any interface to change the operating frequency to reduce EMI and/or RFI effects. For example, a host memory interface and a component memory interface may implement the technique 600 as follows:

The host interface (e.g., the host interface 120, or the like) may enable frequency compensation.

The host interface may send a message (e.g., a transaction layer packet (TLP), or the like) to the component interface (e.g., the component interface 220, or the like). The message may include an indication of a target frequency, a step size, a request to decrement the frequency of operation, a request to increment the frequency of operation, or the like.

The component interface may send a response message to the host interface including an indication the component interface is ready to change operating frequency as directed by the host.

The host interface, upon receiving the response message, may send another message to the component interface including an indication to implement the frequency change.

The host interface and the component interface may implement the frequency change (e.g., decrement or increment their operating frequency based on the step size, or the like).

6. The component interface may send a response message to the host interface including an indication the component interface is done changing the frequency.

The host interface, upon receiving the response message indicating the component interface completed changing its operating frequency, may send a message (e.g., a TLP, or the like) to the component interface indicating the frequency shift operation is complete.

The host interface and the component interface may resume normal operation at the new operating frequency.

FIG. 7 illustrates an example of a first logic flow. As shown in this figure, the first logic flow includes a logic flow 700. Logic flow 700 may be representative of some or all of the operations executed by one or more logic, features, or devices described herein, such as component interface 120 or HFNC 127.

In this illustrated example, logic flow 700 at block 710 may receive a control signal to include an indication of an amount of EMI and/or RFI effects. For example, the HFNC 127 may receive an indication (e.g., from host system 100, control routine 135, or the like) that EMI and/or RFI effects from the interface are interfering with the system (e.g., the communications interface 140, or the like).

The logic flow 700 at block 720 may determine whether the amount of EMI and/or RFI effects exceed a threshold level. For example, the HFNC 127 may determine whether the EMI and/or RFI effects on the communication interface exceed a threshold level.

The logic flow 700 at block 730 may change the operating frequency of the interface from a first operating frequency to a second operating frequency different than the first operating frequency based on determining that the EMI and/or RFI effects exceed the threshold level. For example, the HFNC 127 may change operating frequencies to a frequency outside a range corresponding to the EMI and/or RFI effects.

FIG. 8 illustrates an example of a second logic flow. As shown in this figure, the second logic flow includes a logic flow 800. Logic flow 800 may be representative of some or all of the operations executed by one or more logic, features, or devices described herein, such as component interface 220 or CFNC 227.

In this illustrated example, logic flow 800 at block 810 may receive a control signal to include an indication to change a frequency of operation of an interface. For example, the CFNC 227 may receive a control signal (e.g., from the HFNC 127, or the like) to include an indication to change operating frequencies.

The logic flow at block 820 may change the operating frequency of the interface from a first operating frequency to a second operating frequency different than the first operating frequency based on determining that the EMI and/or RFI effects exceed the threshold level. For example, the CFNC 227 may change operating frequencies to a frequency outside a range corresponding to the EMI and/or RFI effects (e.g., a frequency dictated by the HFNC 127, or the like).

Figure 9:
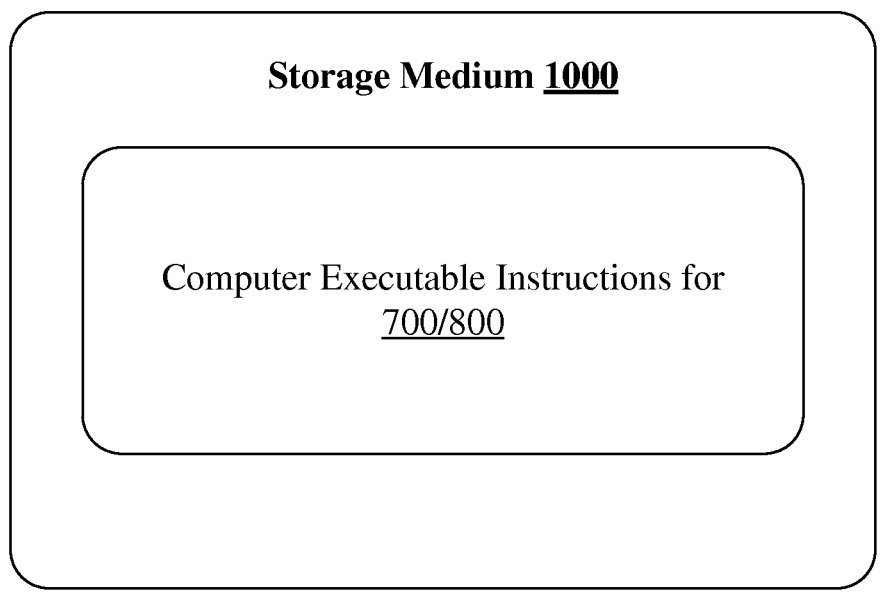
FIG. 9 illustrates an example storage medium.

FIG. 9 illustrates an example of a first storage medium. As shown in this figure, the first storage medium includes a storage medium 1000. The storage medium 1000 may comprise an article of manufacture. In some examples, storage medium 1000 may include any non-transitory computer readable medium or machine readable medium, such as an optical, magnetic or semiconductor storage. Storage medium 1000 may store various types of computer executable instructions, such as instructions to implement logic flow 900. Examples of a computer-readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 10:
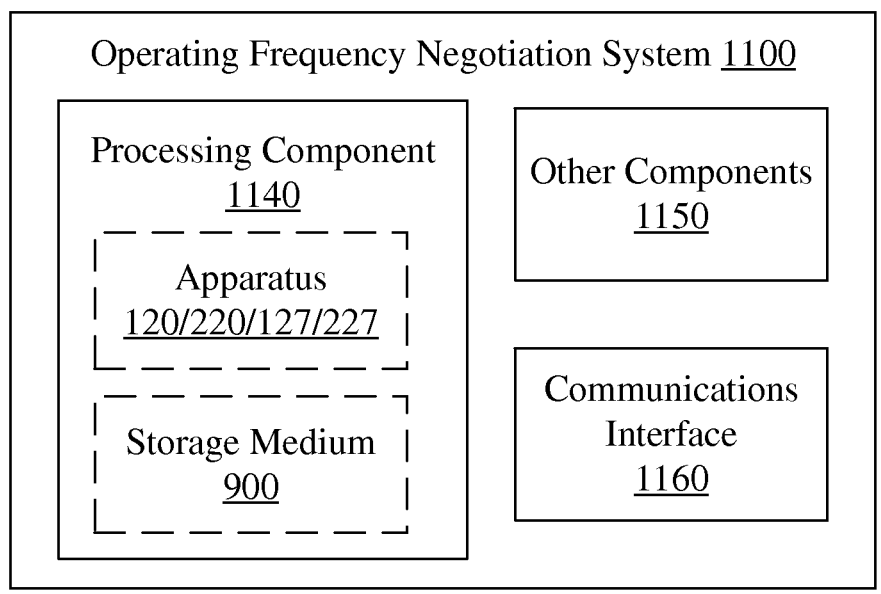
FIG. 10 illustrates an example power loss shutdown system.

FIG. 10 illustrates an example system 1100. In some examples, as shown in this figure, the system 1100 may include a processing component 1140, other components 1150, or a communications interface 1160. According to some examples, system 1100 may be implemented in a device to be coupled to an interface, such as, an SSD, a memory component, a communications component, an input component, an output component, or the like.

According to some examples, processing component 1140 may execute processing operations or logic for apparatus 120, 220, 127, and/or 227 and/or storage medium 1000. Processing component 1140 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other components 1150 may include common computing elements or circuitry, such as one or more processors, multi-core processors, co-processors, memory units, interfaces, oscillators, timing devices, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory or any other type of storage media suitable for storing information.

In some examples, communications interface 1160 may include logic and/or features to support a communication interface. For these examples, communications interface 1160 may include one or more communication interfaces that operate according to various communication protocols or standards to communicate over communication links or channels. Communications may occur via use of communication protocols or standards described in one or more industry standards (including progenies and variants) such as those associated with the PCI Express, SATA or SCSI standard or specifications.

The components and features of power loss shutdown system 1100 may be implemented using any combination of discrete circuitry, application specific integrated circuits (ASICs), logic gates and/or single chip architectures. Further, the features of power loss shutdown system 1100 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the example power loss shutdown system 1100 shown in the block diagram of this figure may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first, " "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The following examples of the present disclosure are provided.

Example 1. An apparatus comprising: an interface logic component to send a signal over an interface; and a frequency negotiation component to dynamically adjust an operating frequency of the interface, the interface logic component to operate based on an independent reference clock.

Example 2. The apparatus of example 1, the interface logic component to include the independent reference clock.

Example 3. The apparatus of example 1, the independent reference clock a first independent reference clock, the interface logic component to send the signal over the interface to a component interface, the component interface to operate based on a second independent reference clock.

Example 4. The apparatus of example 1, the frequency negotiation component to dynamically adjust the operating frequency of the interface logic component to dynamically adjust the operating frequency of the interface.

Example 5. The apparatus of example 1, the frequency negotiation component to receive a first control signal to include an indication to change the operating frequency.

Example 6. The apparatus of example 5, the frequency negotiation component to dynamically adjust the operating frequency from a first frequency to a second frequency different than the first frequency, the first control signal to include an indication of the second frequency.

Example 7. The apparatus of example 5, the first control signal received from a host interface.

Example 8. The apparatus of example 7, the frequency negotiation component to: activate a transient frequency compensation for the interface; and send a second control signal to the host interface, the second control signal to include an indication that the frequency negotiation component is ready to adjust the operating frequency.

Example 9. The apparatus of example 8, the frequency negotiation component to: determine whether the operating frequency has been changed adjusted; and deactivate the transient frequency compensation and activate a steady-state frequency compensation based on a determination that the operating frequency has been adjusted.

Example 10. The apparatus of example 1, the frequency negotiation component to:

receive a first control signal from a host computing device, the first control signal to include an indication of an amount of electromagnetic interference (EMI) or radio frequency interference (RFI) effects; determine whether the amount of EMI or RFI effects exceed a threshold level; and adjust the operating frequency based on a determination that the amount of EMI or RFI effects exceed a threshold level.

Example 11. The apparatus of example 1, the frequency negotiation component to send a control signal to a component interface, the control signal to include an indication to adjust an operating frequency of the component interface to the second frequency.

Example 12. The apparatus of example 11, comprising the independent reference clock, the component interface to comprise a component reference clock, the independent reference clock different than the component reference clock.

Example 13. The apparatus of any one of examples 7 to 9, comprising the independent reference clock, the host interface to comprise a host reference clock, the independent reference clock different than the host reference clock.

Example 14. A computer-implemented method comprising: receiving a first control signal to include an indication to change an operating frequency of an interface, the interface to operate at the operating frequency at least partially based on an independent reference clock; and dynamically adjusting based on the received first control signal, the operating frequency of the interface.

Example 15. The computer-implemented method of example 14, the first control signal to include an indication to dynamically adjust the operating frequency from a first frequency to a second frequency different than the first frequency.

Example 16. The computer-implemented method of example 14, the first control signal received from a host interface.

Example 17. The computer-implemented method of example 16, comprising: activating a transient frequency compensation for the interface; and sending a second control signal to the host interface, the second control signal to include an indication that the interface is ready to adjust the operating frequency.

Example 18. The computer-implemented method of example 17, comprising: determining whether the operating frequency has been adjusted; and deactivating the transient frequency compensation and activating a steady-state frequency compensation based on a determination that the operating frequency has been adjusted.

Example 19. The computer-implemented method of example 14, comprising: receiving the first control signal from a host computing device, the first control signal to include an indication of an amount of electromagnetic interference (EMI) or radio frequency interference (RFI) effects; determining whether the amount of EMI or RFI effects exceed a threshold level; and adjusting the operating frequency based on a determination that the amount of EMI or RFI effects exceed a threshold level.

Example 20. The computer-implemented method of example 19, comprising sending a second control signal to a component interface, the second control signal to include an indication to dynamically adjust an operating frequency of the component interface to dynamically adjust the operating frequency of the interface.

Example 21. At least one machine readable medium comprising a plurality of instructions that in response to be executed by system at a host computing platform cause the system to carry out a method according to any one of examples 14 to 20.

Example 22. An apparatus comprising means for performing the methods of any one of examples 14 to 20.

Example 23. At least one machine readable medium comprising a plurality of instructions that in response to being executed on system at an interface cause the interface to dynamically adjust an operating frequency of an interface, the interface to operate at the operating frequency based on an independent reference clock.

Example 24. The at least one machine readable medium of example 23, the instructions to further cause the interface to receive a first control signal to include an indication to dynamically adjust the operating frequency from a first frequency to a second frequency different than the first frequency.

Example 25. The at least one machine readable medium of example 24, the first control signal to include an indication of the second frequency.

Example 26. The at least one machine readable medium of example 24, the first control signal received from a host interface.

Example 27. The at least one machine readable medium of example 26, the instructions to further cause the interface to: activate a transient frequency compensation for the interface; and send a second control signal to the host interface, the second control signal to include an indication that the interface is ready to adjust the operating frequency.

Example 28. The at least one machine readable medium of example 27, the instructions to further cause the interface to: determine whether the operating frequency has been adjusted; and deactivate the transient frequency compensation and activate a steady-state frequency compensation based on a determination that the operating frequency has been adjusted.

Example 29. The at least one machine readable medium of example 23, the instructions to further cause the interface to: receive a first control signal from a host computing device, the first control signal to include an indication of an amount of electromagnetic interference (EMI) or radio frequency interference (RFI) effects; determine whether the amount of EMI or RFI effects exceed a threshold level; and adjust the operating frequency based on a determination that the amount of EMI or RFI effects exceed a threshold level.

Example 30. The at least one machine readable medium of example 29, the instructions to further cause the interface to send a second control signal to a component interface, the second control signal to include an indication to dynamically adjust an operating frequency of the component interface to dynamically adjust the operating frequency of the interface.

Example 31. A memory device comprising: a memory array; an interface logic component to send a signal over an interface; and a frequency negotiation component to dynamically adjust an operating frequency of the interface, the interface logic component to operate based on an independent reference clock.

Example 32. The memory device of example 31, the frequency negotiation component to receive a first control signal to include an indication to dynamically adjust the operating frequency from a first frequency to a second frequency different than the first frequency.

Example 33. The memory device of example 32, the first control signal to include an indication of the second frequency.

Example 34. The memory device of example 32, the first control signal received from a host interface.

Example 35. The memory device of example 34, the frequency negotiation component to: activate a transient frequency compensation for the interface; and send a second control signal to the host interface, the second control signal to include an indication that the frequency negotiation component is ready to adjust the operating frequency.

Example 36. The memory device of example 35, the frequency negotiation component to: determine whether the operating frequency has been adjusted; and deactivate the transient frequency compensation and activate a steady-state frequency compensation based on a determination that the operating frequency has been adjusted.

Example 37. The memory device of example 31, the frequency negotiation component to: receive a first control signal from a host computing device, the first control signal to include an indication of an amount of electromagnetic interference (EMI) or radio frequency interference (RFI) effects; determine whether the amount of EMI or RFI effects exceed a threshold level; and adjust the operating frequency based on a determination that the amount of EMI or RFI effects exceed a threshold level.

Example 38. The memory device of example 37, the frequency negotiation component to send a second control signal to a component interface, the second control signal to include an indication to dynamically adjust an operating frequency of the component interface to dynamically adjust the operating frequency of the interface.

Example 39. The memory device of example 38, comprising the independent reference clock, the component interface to comprise a component reference clock, the independent reference clock different than the component reference clock.

Example 40. The memory device of any one of examples 34 to 36, comprising the independent reference clock, the host interface to comprise a host reference clock, the independent reference clock different than the host reference clock.

Example 41. The memory device of example 31, the memory array comprising DRAM, NAND memory, NOR memory, 3-Dimensional cross-point memory, ferroelectric memory, silicon-oxide-nitride-oxide-silicon (SONOS) memory, polymer memory, ferroelectric polymer memory, ferroelectric transistor random access memory (FeTRAM or FeRAM), nanowire, phase change memory, phase change memory with switch, magnetoresistive random access memory (MRAM), or spin transfer torque (STT) memory.

What is claimed is:

1. An apparatus comprising:
a host interface to exchange signals with a component interface over a bus, the host interface to operate based on a first reference clock and the component interface to operate based on a second reference clock different that the first reference clock; and
circuitry coupled to the host interface, the circuitry to:
send a first control signal to the component interface, the first control signal comprising an indication to change an operating frequency of the component interface,
receive, from the component interface, an indication that the component interface is ready to change the operating frequency of the component interface,
activate a transient frequency compensation for the bus, and
dynamically change an operating frequency of the host interface.

2. The apparatus of claim 1, the circuitry to dynamically change the operating frequency of the host interface from a first operating frequency to a second operating frequency different than the first operating frequency, the first control signal to include an indication of the second operating frequency.

3. The apparatus of claim 1, the circuitry to:
determine whether the operating frequency of the component interface has been changed; and
deactivate the transient frequency compensation and activate a steady-state frequency compensation based on a determination that the operating frequency of the component interface has been changed.

4. The apparatus of claim 1, the circuitry to:
identify an amount of electromagnetic interference (EMI) or radio frequency interference (RFI) effects on the bus;
determine whether the amount of EMI or RFI effects on the bus exceed a threshold level; and
send, responsive to a determination that the amount of EMI or RFI effects on the bus exceed the threshold level, the first control signal to the component interface.

5. The apparatus of claim 1, comprising the first reference clock.

6. The apparatus of claim 1, the circuitry to:
send, from the host interface to a second component interface via the bus, a second control signal to include an indication to change an operating frequency of the second component interface, the second component interface to operate based on a third reference clock different than the first reference clock or the second reference clock;
receive, from the second component interface, an indication that the second component interface is ready to change the operating frequency of the second component interface;
activate the transient frequency compensation for the bus based receiving the indication from the component interface and the second component interface; and
dynamically change the operating frequency of the host interface based on receiving the indication from the component interface and the second component interface.

7. The apparatus of claim 6, the circuitry to:
determine whether the operating frequency of the second component interface has been changed; and
deactivate the transient frequency compensation and activating a steady-state frequency compensation based on a determination that the operating frequency of the component interface and the operating frequency of the second component interface have been changed.

8. A computer-implemented method comprising:
sending, from a host interface to a component interface via a bus, a first control signal to include an indication to change an operating frequency of the component interface, the host interface to operate based on a first reference clock and the component interface to operate based on a second reference clock different than the first reference clock;
receiving, from the component interface, an indication that the component interface is ready to change the operating frequency of the component interface;
activating a transient frequency compensation for the bus; and
dynamically change an operating frequency of the host interface.

9. The computer-implemented method of claim 8, the first control signal to include an indication to dynamically change the operating frequency of the component interface from a first frequency to a second frequency different than the first frequency.

10. The computer-implemented method of claim 8, comprising:
determining whether the operating frequency of the component interface has been changed; and
deactivating the transient frequency compensation and activating a steady-state frequency compensation based on a determination that the operating frequency of the component interface has been changed.

11. The computer-implemented method of claim 8, comprising:
identifying an amount of electromagnetic interference (EMI) or radio frequency interference (RFI) effects on the bus;
determining whether the amount of EMI or RFI effects on the bus exceed a threshold level; and
sending, responsive to a determination that the amount of EMI or RFI effects on the bus exceed the threshold level, the first control signal to the component interface.

12. The computer-implemented method of claim 8, comprising:
sending, from the host interface to a second component interface via the bus, a second control signal to include an indication to change an operating frequency of the second component interface, the second component interface to operate based on a third reference clock different than the first reference clock or the second reference clock;

receiving, from the second component interface, an indication that the second component interface is ready to change the operating frequency of the second component interface;
activating the transient frequency compensation for the bus based receiving the indication from the component interface and the second component interface; and
dynamically changing the operating frequency of the host interface based on receiving the indication from the component interface and the second component interface.

13. The computer-implemented method of claim 12, comprising:
determining whether the operating frequency of the second component interface has been changed; and
deactivating the transient frequency compensation and activating a steady-state frequency compensation based on a determination that the operating frequency of the component interface and the operating frequency of the second component interface have been changed.

14. At least one machine-readable storage medium comprising instructions that when executed by processing circuitry of a host interface, cause the processing circuitry to:
send, from the host interface to a component interface via a bus, a first control signal to include an indication to change an operating frequency of the component interface, the host interface to operate based on a first reference clock and the component interface to operate based on a second reference clock different than the first reference clock;
receive, from the component interface, an indication that the component interface is ready to change the operating frequency of the component interface;
activate a transient frequency compensation for the bus; and
dynamically change an operating frequency of the host interface.

15. The at least one machine-readable storage medium of claim 14, the first control signal to include an indication to dynamically change the operating frequency of the component interface from a first frequency to a second frequency different than the first frequency.

16. The at least one machine-readable storage medium of claim 14, the instructions, when executed, cause the processing circuitry to:
determine whether the operating frequency of the component interface has been changed; and
deactivate the transient frequency compensation and activating a steady-state frequency compensation based on a determination that the operating frequency of the component interface has been changed.

17. The at least one machine-readable storage medium of claim 14, the instructions, when executed, cause the processing circuitry to:
identify an amount of electromagnetic interference (EMI) or radio frequency interference (RFI) effects on the bus;
determining whether the amount of EMI or RFI effects on the bus exceed a threshold level; and
sending, responsive to a determination that the amount of EMI or RFI effects on the bus exceed the threshold level, the first control signal to the component interface.

18. The at least one machine-readable storage medium of claim 14, the instructions, when executed, cause the processing circuitry to:
send, from the host interface to a second component interface via the bus, a second control signal to include an indication to change an operating frequency of the second component interface, the second component interface to operate based on a third reference clock different than the first reference clock or the second reference clock;
receive, from the second component interface, an indication that the second component interface is ready to change the operating frequency of the second component interface;
activate the transient frequency compensation for the bus based receiving the indication from the component interface and the second component interface; and
dynamically change the operating frequency of the host interface based on receiving the indication from the component interface and the second component interface.

19. The at least one machine-readable storage medium of claim 18, the instructions, when executed, cause the processing circuitry to:
determine whether the operating frequency of the second component interface has been changed; and
deactivate the transient frequency compensation and activating a steady-state frequency compensation based on a determination that the operating frequency of the component interface and the operating frequency of the second component interface have been changed.

* * * * *